US010212763B2

(12) United States Patent
Kurley et al.

(10) Patent No.: US 10,212,763 B2
(45) Date of Patent: Feb. 19, 2019

(54) HEATED GLOVE AND METHOD OF CONTROLLING THE HEATING OF GLOVE

(71) Applicant: Soletics, LLC, Grand Rapids, MI (US)

(72) Inventors: Michael Kurley, Grand Rapids, MI (US); Vanessa Gore, Grand Rapids, MI (US); Lindsay Noonan, Troy, MI (US)

(73) Assignee: Soletics, LLC, Grand Rapids, MI (US)

( * ) Notice: Subject to any disclaimer, the term of this patent is extended or adjusted under 35 U.S.C. 154(b) by 0 days.

(21) Appl. No.: 14/933,389

(22) Filed: Nov. 5, 2015

(65) Prior Publication Data

US 2016/0198529 A1 Jul. 7, 2016

Related U.S. Application Data

(60) Provisional application No. 62/075,847, filed on Nov. 5, 2014.

(51) Int. Cl.

| | |
|---|---|
| ***H05B 1/02*** | (2006.01) |
| ***H05B 3/14*** | (2006.01) |
| ***H05B 3/34*** | (2006.01) |
| ***A41D 19/015*** | (2006.01) |
| ***A23B 4/03*** | (2006.01) |
| ***F26B 11/18*** | (2006.01) |
| ***A23L 1/318*** | (2006.01) |

(52) U.S. Cl.
CPC ..... *H05B 1/0272* (2013.01); *A41D 19/01535* (2013.01); *H05B 3/146* (2013.01); *H05B 3/342* (2013.01); *H05B 2203/014* (2013.01); *H05B 2203/036* (2013.01); *H05B 2203/037* (2013.01)

(58) Field of Classification Search
CPC ........... H05B 1/0272; H05B 2203/014; H05B 2203/036; H05B 2203/037; H05B 3/146; H05B 3/342
USPC ....... 219/211, 212, 227, 406, 407, 201, 492, 219/527, 549; 519/535; 2/159
See application file for complete search history.

(56) References Cited

U.S. PATENT DOCUMENTS 4,021,640 A * 5/1977 Gross ............... A41D 19/01535 2/159
9,402,582 B1 * 8/2016 Parviz .................. A61B 5/6806
2009/0056107 A1 * 3/2009 Williams ............... H05B 3/342 29/610.1

(Continued)

*Primary Examiner* — Tu B Hoang
*Assistant Examiner* — Vy T Nguyen
(74) *Attorney, Agent, or Firm* — The Watson IP Group, PLC; Jovan N. Jovanovic; Vladan M. Vasiljevic

(57) ABSTRACT

A heated glove having a glove structure and a heating assembly. The glove structure includes an inner body having an outer surface, an inner surface defining a cavity with an opening providing ingress into the cavity. The heating assembly has at least one heating zone. The heating zone has a conductive fabric portion, a heating mesh portion and a sensing assembly. The conductive fabric portion has a first circuit portion and a second circuit portion. The two portions have a first end across which a voltage differential can be placed, and second ends that are spaced apart from each other. The heating mesh portion extends between the second ends of the first and second circuit portions so as to be in electrical communication therewith. The sensing assembly has a temperature sensor. The temperature sensor is positioned proximate the heating mesh portion to determine a temperature of an area proximate thereto.

11 Claims, 3 Drawing Sheets

(56) References Cited

U.S. PATENT DOCUMENTS

| | | | | |
|---|---|---|---|---|
| 2010/0057168 | A1* | 3/2010 | Slade | A61F 7/007 219/211 |
| 2012/0324620 | A1* | 12/2012 | Murphy | G06F 3/039 2/159 |

* cited by examiner

HEATED GLOVE AND METHOD OF CONTROLLING THE HEATING OF GLOVE

CROSS-REFERENCE TO RELATED APPLICATION

This application claims priority from U.S. Provisional App. Ser. No. 62/075,847 filed Nov. 5, 2014, entitled "Heated Glove," the entire specification of which is hereby incorporated by reference in its entirety.

BACKGROUND OF THE DISCLOSURE

1. Field of the Disclosure

The disclosure relates in general to heated clothing, and more particularly, to a heated glove and a method of controlling the heating of a glove. Such a glove is exceedingly well suited for patients and sufferers of Raynaud's syndrome, or Raynaud's phenomenon. The disclosure is not limited to use therewith, and has utility outside of such uses.

2. Background Art

The use of heated clothing is known in the art. Among other different configurations, heated clothing are typically well insulated and include insulation along with a heating element. Heating elements may include electrically heated elements or may include heat elements that are the result of chemical reactions. Some of the reactions are reversible and some of the reactions are not.

One particular area wherein heated gloves may be of particular use is with Raynaud's syndrome. The syndrome is a disorder that affects blood vessels (often times in the fingers). The blood vessels narrow when cold or feeling stressed, thereby not allowing the blood to get to the surface of the skin. The affected areas may turn white and blue. When blood flow returns, the skin turns red, throbs and tingles. In severe cases, or over repeated attacks, the loss of blood flow can cause sores and/or tissue death. It is not uncommon to have patients lose digits (or portions of digits) due to the repeated attacks. Additionally, it seems as if repeated attacks cause permanent damage to the underlying blood vessels, making future attacks worse. This cycle repeats until finally, the tissue dies.

Solutions have been provided to those with Raynaud's syndrome. However, such solutions have had less than ideal results. For example, some solutions rely on Far Infrared reflecting fabric that reflects heat. Other solutions include chemical reactions, or merely provide heavy insulation. Still other patients rely on heated gloves that include an activated element that heats the entirety of the glove (and are typically gloves used for other purposes, such as outdoor snow gloves). Each of these solutions has drawbacks. As it is the change in temperature that typically triggers an attack, many have a response time that is not adequate to prevent an attack. Other solutions include large power draws, making their extended use impractical. Still other solutions are exceedingly thick or large such that manipulation of objects (i.e., normal every day living) is hampered.

SUMMARY OF THE DISCLOSURE

The disclosure is directed to a heated glove. The heated glove comprises a glove structure and a heating assembly. The glove structure has an inner body having an outer surface, an inner surface defining a cavity with an opening providing ingress into the cavity. The heating assembly includes at least one heating zone. The at least one heating zone includes a conductive fabric portion, a heating mesh portion and a sensing assembly. The conductive fabric portion has a first circuit portion and a second circuit portion. The two portions have a first end across which a voltage differential can be placed, and second ends that are spaced apart from each other. The heating mesh portion extends between the second ends of the first and second circuit portions so as to be in electrical communication therewith. The sensing assembly has a temperature sensor. The temperature sensor is positioned proximate the heating mesh portion to determine a temperature of an area proximate thereto.

In some configurations, the heating assembly wherein the at least one heating zone comprises a plurality of heating zones.

In some configurations, the glove structure has a base region, a thumb region, an index finger region, a middle finger region, a ring finger region and a pinky finger region. In such a configuration, the at least one heating zone further comprises at least one heating zone associated with each of the thumb region, the index finger region, the middle finger region, the ring finger region and the pinky finger region.

In some configurations, the heated mesh portion of each of the heating zones is positioned proximate a distal end of each of the thumb region, the index finger region, the middle finger region, the ring finger region and the pinky finger region. Additionally, the temperature sensor is positioned proximate the distal end thereof and spaced apart from the heated mesh portion.

In some configurations, the second circuit portion of each of the plurality of heating zones are in electrical communication.

In some configurations, the conductive fabric portion is attached to the outer surface of the inner body.

In some configurations, the conductive fabric portion is stitched to the outer surface of the inner body.

In some configurations, the first circuit portion extends on an upper side of the outer surface of the inner body of the glove structure. The second circuit portion extends on a lower side of the outer surface of the inner body of the glove structure.

In some configurations, the heated glove further includes an outer body extending over the inner body, with the heating assembly being at least partially positioned therebetween.

In some configurations, the heating assembly further comprises a controller coupling port. The controller coupling port is configured to allow communication with each of the conductive fabric portion and the sensing assembly of each one of the at least one heating zones.

In some configurations, the heating assembly further comprises a controller attachable to the controller coupling port. The controller is configured to selectively supply current to the conductive fabric portion of each one of the at least one heating zones, based upon a reading of the temperature sensor associated with each one of the at least one heating zones.

In some configurations, the at least one heating zone comprises a plurality of heating zones. The controller is structurally configured to supply current to the conductive fabric portion of each one of the at least one heating zones independently based upon a reading of the temperature sensor associated with each one of the plurality of heating zones, to, in turn, individually control the heating of each one of the plurality of heating zones.

In some configurations, the controller is releasably attachable to the controller coupling port, with the controller further including a battery associated therewith.

In some configurations, the controller coupling port further includes a plurality of conductor connection points, with one conductor connection point for electrical coupling with the first circuit portion of each of the at least one heating zones, one conductor connection point for electrical coupling with a first circuit portion of the temperature sensor of each one of the at least one heating zones, one conductor collectively for the second circuit portion of each of the at least one heating zones, and one conductor collectively for a second circuit portion of the temperature sensor of each one of the at least one heating zones.

In some configurations, the sensing assembly further includes a first circuit portion and a second circuit portion. Each has a first end across which a voltage difference can be applied and a second end electrically coupled to the temperature sensor, with the first and second portions being embedded within the conductive fabric portions being electrically isolated therefrom.

In another aspect of the disclosure, the disclosure is directed to a method of controlling the heating of a glove, the method comprising: providing a glove structure having an inner body with a base region, a thumb region, an index finger region, a middle finger region, a ring finger region and a pinky finger region; associating a heating mesh portion with each of the thumb region, the index finger region, the middle finger region, the ring finger region and the pinky finger region; electrically coupling each heating mesh portion with a voltage difference through conductive fabric portions extending to the heating mesh portion and completing an electrical circuit therewith; associating a temperature sensor with each of the thumb region, the index finger region, the middle finger region, the ring finger region and the pinky finger region; sensing the temperature at each of the thumb region, the index finger region, the middle finger region, the ring finger region and the pinky finger region; and directing current individually to the heating mesh portion of any one or more of the thumb region, the index finger region, the middle finger region, the ring finger region and the pinky finger region if the temperature sensed therein by a respective one of the temperature sensors falls below a predetermined temperature.

In some configurations, the method further includes the step of releasably attaching a controller to the glove structure, the controller being in electrical communication with each heating mesh portion, each temperature sensor, and a power supply.

BRIEF DESCRIPTION OF THE DRAWINGS

The disclosure will now be described with reference to the drawings wherein.

DETAILED DESCRIPTION OF THE DISCLOSURE

Figure 1:
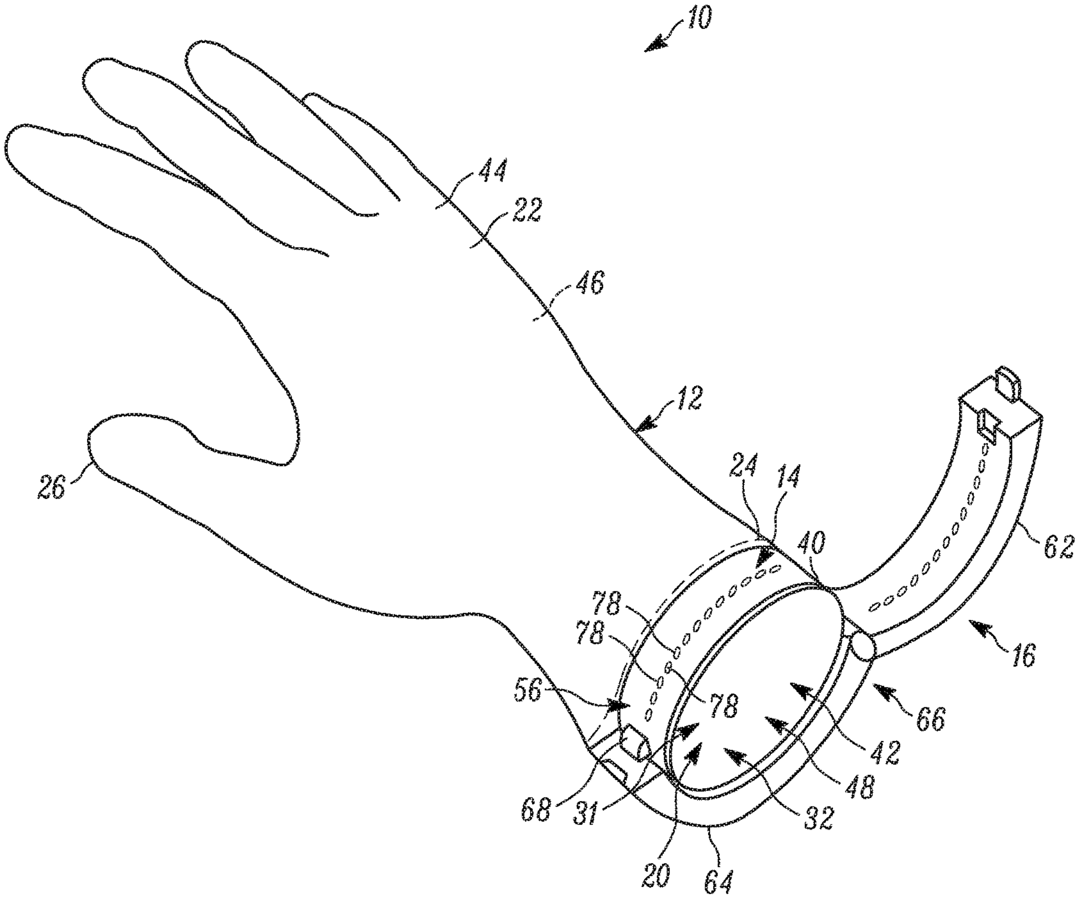
FIG. 1 of the drawings is a perspective view of an exemplary configuration of the heated glove of the present disclosure.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the heated glove is shown generally at 10. The heated glove includes a glove structure 12, a heating assembly 14 and a controller 16. The heated glove, it is contemplated, can be made sufficiently thin and the like (where necessary) so as to be able to be worn while performing day to day tasks by a patient. In addition, it is contemplated that the patient may be able to wear the gloves for an extended period of time. The gloves, preferably, are washable and durable, while providing adequate heating to preclude an attack with a response time that is sufficient to ward off an attack.

Figure 2:
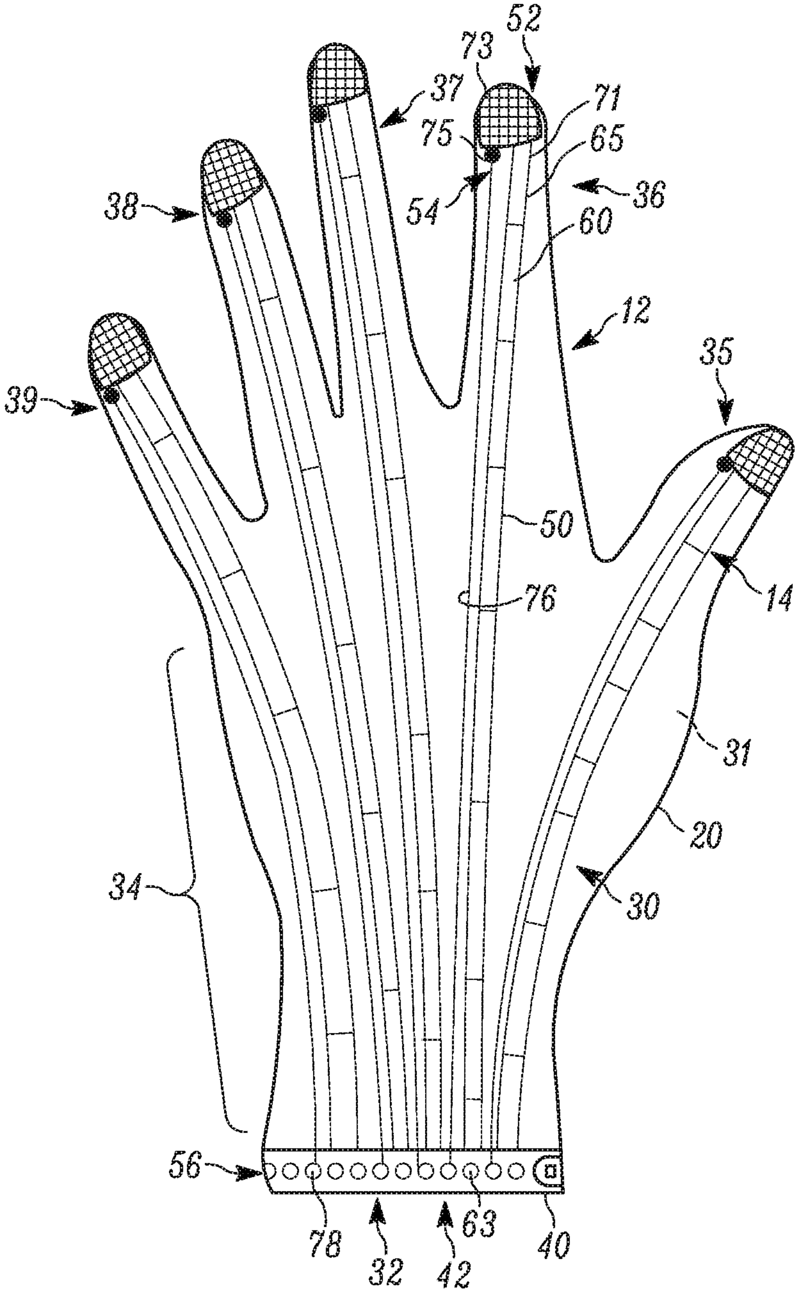
FIG. 2 of the drawings is a top plan view of the heating assembly as positioned on the inner body of the glove structure.
Figure 3:
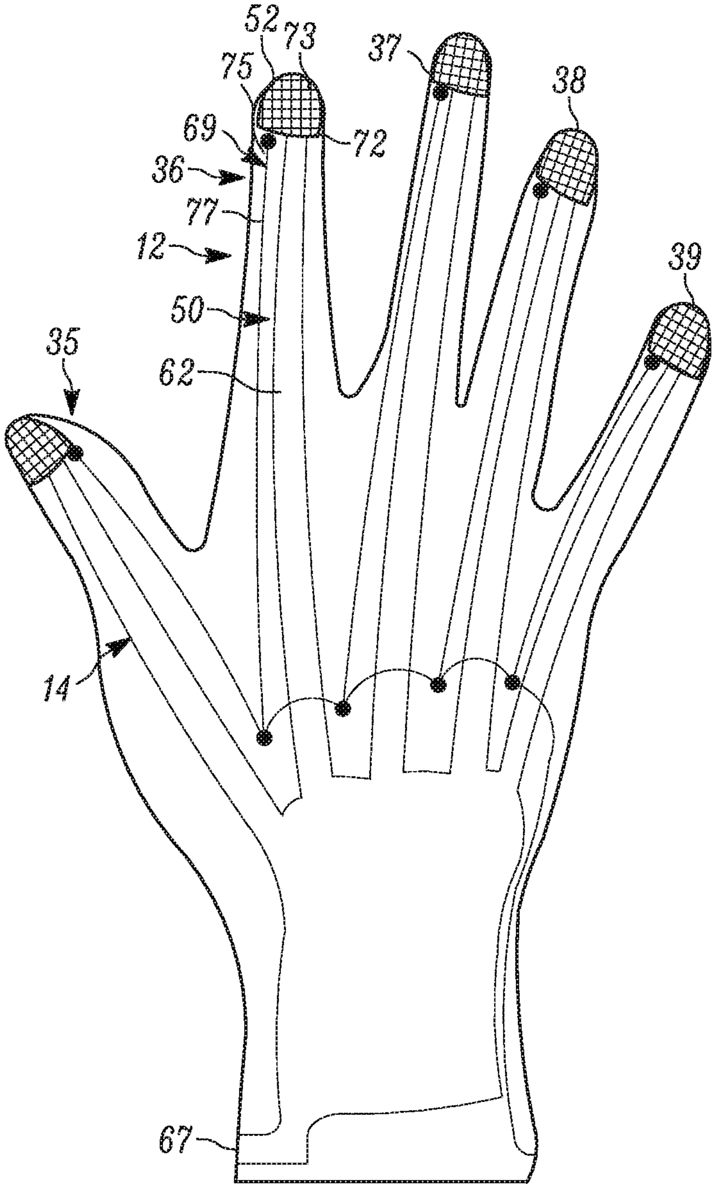
FIG. 3 of the drawings is a bottom plan view of the heating assembly as positioned on the inner body of the glove structure.

With reference to FIGS. 1 through 3, the glove structure 12 includes inner body 20, outer body 22 and body coupling structure 24. The inner body 20 generally comprises a fabric material (typically an insulative material) which may be water resistant. The inner body 20 is defined by an outer surface 30, an inner surface 31 and an opening 32. The inner surface defines a cavity 42 with the opening 32 providing ingress into the cavity. The opening 32 is defined by perimeter 40. The glove structure typically includes a base region 34 (which covers the palm and the outer hand region opposite the palm). Extending from the base region are the finger regions, namely the index finger region 36, middle finger region 37, ring finger region 38 and pinky finger region 39. It will be understood that these regions are generally continuous, defining a single cavity that generally follows the shape of an outstretched hand. It will be understood that such inner body 20 may be provided in a plurality of standard sizes (S, M, L, XL, etc). It will further be understood that in other configurations, custom sizes and/or custom configurations (for amputations, irregularities and the like) are contemplated. Indeed, the disclosure is not limited to any particular size or style of glove. It will be understood, additionally that a mitten or the like (wherein multiple fingers are placed together) is likewise contemplated.

The outer body 22 is shown in FIG. 1 as comprising an outer layer that covers the inner layer (and also portions of the heating assembly). In the configuration shown, the outer body comprises a similarly thin fabric material, which minimizes the intrusiveness of the overall glove structure and maximizes the ability of a user to operate and complete common tasks with minimal impediment and discomfort. In other configurations, the outer layer may comprise a mitten, regardless of the configuration of the inner body as such. In still other configurations, the outer body may be configured for specialized requirements (mechanic's gloves, winter gloves, ski gloves, work gloves, among others). Indeed, there is no limitation on the material from which the outer body is formed, however, preferably, any conductive elements are isolated from the heating assembly (unless portions of the outer body are utilized for purposes of electrical conduction or the like).

The outer body 22 includes outer surface 44, inner surface 46 and opening 48 providing access to a cavity 45 formed thereby. The outer body is positioned over the inner body and the heating assembly so as to sandwich the heating assembly (at least portions thereof) therebetween. The outer body and the inner body may be coupled together through body coupling structure 24 which in the configuration shown, comprises a stitching 26 that joins the components together proximate the respective openings 23, 48. In other configurations, the body coupling structure may comprise non releasable coupling structures such as glue, adhesive, heat sealing, RF welding, stitching, fasteners, snaps, interference fit structures and the like which may be positioned at the opening or at any number of different locations. It will be understood that the body coupling structure may also include any combination of the foregoing. In addition, other coupling strategies are contemplated. In other embodiments, the two may be formed from the same material, wherein the material is folded over itself to form the inner and outer body. In still other configurations, the inner and the outer body may be separable through releasable fasteners and coupling structures. In some configurations, a combination of releasable (fasteners, hook and loop fasteners, snaps, clips and the like) and intended to be non-releasable coupling structures may be utilized.

The heating assembly 14 is shown in FIGS. 1 through 3 as comprising at least one conductive fabric portion 50*a*, at least one heating mesh portion 52*a*, at least one sensing assembly 54*a* and controller coupling port 56. It will be understood that at least one of each of the conductive fabric portion, the heating mesh portion and the sensing assembly are contemplated for each heating zone. In the configuration shown, to maximize the efficiency of the system, a separate zone is provided for each of the fingers and the thumb of the user. As such, in the configuration shown, there are a total of five separate zones, and consequently five separate heating mesh portions and five separate sensing assemblies. Additionally, while some portions of the conductive fabric portions can be combined, there are five separate first circuit portions (which will be described below). It will be understood that in other configurations, a single zone may be utilized for the sensing assembly, and while separate heating mesh portions may be provided, a single conductive fabric may be provided. It will further be understood that while separate zones are contemplated for each of the fingers, for simplicity, the zones can be combined as desired. It has been found, however, that the different digits experience different fluctuations in temperature, and, as such, a system that can react only where necessary and only to the extent necessary provides improved performance and better battery life.

For purposes of simplicity of the disclosure, a single zone, such as the zone directed at the index finger in the configuration shown, with the understanding that the other zones have similar configurations and that the other zones may be complementary thereto. In particular, the conductive fabric portion 50*a* includes first circuit portion 60 and second circuit portion 62. The circuit portions comprise a metal mesh fabric (formed from metal or a metal coated (otherwise non-metallic fabric) of low resistive value (such that any heat loss is minimal as compared to the heating mesh portion). In the configuration shown, the first circuit portion 60 includes first end 63 and second end 65. The first end is positioned proximate the opening 32 with the second end terminating proximate the heating mesh portion (in this case at or near the tip of the index finger). Among other materials, the material for the conductive fabric portion, may comprise a ripstop silver fabric available from The EMF Safety SuperStore under Cat #322. Such a material comprises a fabric that is nylon and coated with a pure silver coating. The resistivity is less than 0.25 Ohm/sq. Additionally, the weight is approximately 1.1 oz/yd$^2$. The fabric is a 30 den Nylon with 121 threads per inch and a 2 mil thickness. Of course, other fabric type materials having similar characteristics of low weight are contemplated. Again, it is desirable that the first circuit portion be of a resistance that is low enough that substantial heating and energy dissipation does not occur therethrough. It will be understood that the first end of the first circuit portion is coupled to a power source.

In the configuration shown, the first circuit portion 60 comprises an elongated member of a width so that it is spaced apart and electrically isolated from adjoining zones. In the configuration shown, the first circuit portion is stitched (along opposing edges) to the underlying inner body. In other configurations, the first circuit portion can be riveted, adhered, or otherwise coupled to the underlying inner body. It will be understood that primarily, the attachment of the structures is promoted so as to keep adjacent first circuit portions spaced apart from each other. Additionally, so as to be spaced apart from the second circuit portion, the first circuit portion extends along the outer surface 30 of the inner body 20 along the outside of the portion that would cover the upper surface of the hand. Of course, other configurations are contemplated, including configurations that have the circuit portions running in different locations or along different surfaces. Additional reinforcement structures or configuration variations are contemplated at frequently flexed regions (such as regions surrounding joints and the like).

The second circuit portion 62 is shown in FIG. 3 as comprising a first end 67 and a second end 69. The first end is configured to extend from the opening 32 of the inner body to a region proximate the tip of the index finger, or at the tip of the index finger. It will be understood that the second circuit portion may comprise a strip such as the first circuit portion, or may be co-formed with portions that extend to other heating mesh portions. This is because the second circuit portion is connected to ground or to the common line, and, as such, all of the common lines may be joined together prior to reaching the opening 32. As with the first circuit portion, the second circuit portion comprises a similar material of low resistance and is stitched (or otherwise coupled) to the underlying inner body. Again, such attachment is not required, however it is contemplated that the attachment generally precludes the relative movement of any of the conductive portions to limit interaction with adjacent conductive portions or other spaced apart portions.

The heating mesh portion 52*a* includes first end 71 and second end 72. The first end 71 is electrically coupled to the second end of the first circuit portion 60. The second end 72 is electrically coupled to the second end of the second circuit portion 62. Thus, a circuit is presented between the first end of the first circuit portion 60 and the first end of the second circuit portion 62 with the circuit being formed by the first and second circuit portions and the heating mesh portion. The heating mesh portion 52*a* generally comprises a metal based mesh portion (or conductive coated portion) of relatively high resistance, such that the member generates heat when a current is applied to the same. One such material that is contemplated for use is a stainless steel mesh sold from LessEmf, Inc. of Latham, N.Y. as Catalog #A272. The stainless steel mesh is approximately 190 g/m$^2$ and has a resistance of 2 Ohm/sq. The stainless steel fabric has a 0.004 diameter, while other configurations are contemplated as well. In the configuration shown, the member extends around the tip of the index finger portion of the inner body. It is contemplated that various configurations are contemplated for the heating mesh portion. And, the area and shape thereof can be varied so as to be configured to provide heat to the desired regions of the zone that is to be heated. In some configurations, the placement of the heating mesh portion will be proximate the tip of the finger. In other configurations, the heated mesh may be positioned at a number of different locations along the index finger, each of which is coupled to the first and second circuit portions. In some configurations, a heating mesh portion may be positioned proximate the base of the index finger, as nerve endings proximate the base of the finger tend to affect what happens to the blood vessels at the outer extremities of the finger. As such, various positions for the heating mesh are contemplated.

The sensing assembly 54 is shown in FIGS. 2 and 3 as comprising temperature sensor 75, with first circuit portion 76 and second circuit portion 77 extending therefrom. The temperature sensor 75 in the configuration shown comprises a thermocouple that is positioned proximate the tip of the index finger, and preferably spaced apart from the heating mesh portion (or closer to the skin of the user than to the heating mesh portion). It is preferred that the thermocouple take the temperature of the skin and not the heating mesh portion (although variations are contemplated). The first circuit portion 76 is coupled to a power source, and the second circuit portion 77 is coupled to ground or common. As such, the second circuit portion 77 may be coupled to the second circuit portion 77 of other zones. In the configuration shown, the first and second circuit portions may comprise a thin conductor that is extended along the outer surface of the inner body. In other configurations, the thin conductor can be incorporated into a fabric (such as the fabric of the conductive fabric portion) while being electrically isolated therefrom.

The controller coupling port 56 is shown as comprising a plurality of pins and a base which can capture and retain a controller 16. The controller coupling port 56 is the termination point for the different conductive fabric portions, heating mesh portions and the sensing assembly. For example, in the configuration shown, a total of twelve pins (or separate inputs/outputs) are provided. There is one pin for each of the first circuit portions of each of the circuits associated with each finger, totaling five. There is a single common pin for the return from each second circuit portion of each zone (as they are all coupled together at or prior to the controller coupling port). There is also one pin for the first circuit portion of the sensing assembly for each one of the zones, totaling five. Finally, there is a single common pin for the second circuit portions 77. Thus, the total pins is 12 in the configuration shown. Of course, this may be varied if additional sensors are provided, or if circuitry is added into the coupling port, or if additional zones are desired. On the other hand fewer ports are contemplated as well. It will be understood that the particular configuration of the controller coupling port is such that the controller can extend about the perimeter 40 of the inner body of the glove structure. In other embodiments, different configurations and placement are contemplated for the controller.

The controller 16 is shown as comprising a band that extends around the wrist of the user. The controller 16 includes first portion 62, second portion 64, hinge 66 and clasp 68. In the configuration shown, the first portion and the second portion are coupled at the hinge 66 and selectively attachable and detachable at the clasp 68. It will be understood that the controller is intended to couple to the controller coupling plug 56 and includes a mating configuration on either one of the first portion and the second portion. It will further be understood that the first portion and/or the second portion further include control circuitry (which will be described below) and a power source, such as a secondary or rechargeable battery (lithium ion or the like). It will further be understood that a number of ports may be present on the controller 16. For example, a micro-USB port or other port to transmit data and to communicate with the control circuitry and also to charge the battery are contemplated for use. Additionally, a separate battery port or ports may be provided wherein it is contemplated that further battery packs or the like may be electrically coupled through such a port to extend the operating time of the device. It is also contemplated that the device may be have wireless communication through Bluetooth, zigbee, wifi, or the like as well as wireless charging.

The controller 16 can be a general purpose computing device, such as an Arduino electronic prototyping platform, or a mini computing device, as well as custom circuitry that performs the necessary functions. Any such configuration includes a general purpose computing device, of the type disclosed in the provisional from which priority is claimed, the entire specification of which has been incorporated by reference. It will be understood to one of skill in the art the type of programming and control circuitry needed to achieve the desired methods of operation and to receive the different signals and the like and to distribute power to the different heating assembly components.

In operation, the user first places the gloves over the hands and couples the controller to the controller coupling port. Initially, the device is configured so as to maintain a predetermined temperature at the thermocouple readings. For example, and not to be deemed limiting, such a temperature may be 88° F. that is to be maintained at the extremities of the fingers where the different temperature sensors are located. The circuitry samples the readings from the temperature sensors at a predetermined rate. As long as the 88° F. is maintained, none of the heating elements are activated.

When the user, for example places his or her hand in the freezer, the temperature sensors sense a change in temperature. As soon as the temperature drops below 88° F., at a particular sensor, the controller triggers the transmission of current through the respective heating mesh portion 52 as long as the temperature sensor is reading below 88° F. Once the temperature is reached, the current is cut and the heating ceases. It will be understood that with a quick reaction (often sensing substantially less than a one degree drop in readings), with only a minimal amount of heat (or power), the region can be heated back to the initial and desired temperature. Patients who suffer from Raynaud's syndrome have an attack based on a change in temperature, rather than at a particular temperature. Thus, the ability to limit the change in temperature is how the attack can be prevented.

Interestingly, in some situations, only some of the fingers of the hand are exposed to a colder temperature. For example, when a patient picks up a cold drink, only a couple of fingers may handle the drink. As such, it may be that only these fingers decrease in temperature triggering the activation of the heating mesh portion. Most preferably, it is desired that the heat is applied quickly and generally briefly, so that the patient does not experience a cold or a hot, but rather does not sense any change in the local environment at all. Thus, an attack is precluded, as there really was no change in temperature at the localized area. As identified above, it may be that the heating mesh portion and the temperature sensors may be positioned at or near the base of the fingers, as it has been found that the nerve endings and the temperature in that region may control the sensing of a change, and, as such, trigger an attack.

It is contemplated that when the user is done wearing the heated glove, the user can remove the glove. At such time, the controller can be removed, and the rest of the glove can be washed in a conventional manner. Advantageously, due to the fabric configuration of the conductive elements, exposure to washing in a conventional manner does not damage the device. Furthermore, with such a light glove structure, the gloves can be worn while performing any number of different daily tasks without requiring the user to alter any activity.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A heated glove comprising:

a glove structure having an inner body having an outer surface, an inner surface defining a cavity with an opening providing ingress into the cavity, the glove structure further having a base region, a thumb region, an index finger region, a middle finger region, a ring finger region and a pinky finger region: and a heating assembly having a plurality of heating zones, wherein each of the plurality of heating zones is located at each of the thumb region, the index finger region, the middle finger region, the ring finger region and the pinky finger region, each of the plurality of heating zones having:

an electrically conductive fabric portion defining a mesh having a plurality of interwoven conductive threads with a first circuit portion and a second circuit portion, the two portions having a first end across which a voltage differential is placeable, and second ends that are spaced apart from each other;

an electrically conductive heating mesh portion having a plurality of interwoven conductive threads extending between the second ends of the first and second circuit portions so as to be in electrical communication therewith, wherein the electrically conductive fabric portion has a resistance that is lower than a resistance of the heating mesh portion, and wherein the electrically conductive heating mesh portion extends; and a sensing assembly having temperature sensors, each of the temperature sensors being positioned adjacent to the heating mesh portion to determine a temperature of an area adjacent thereto; and a controller coupled to the glove structure the controller having a power source selectively couplable to the electrically conductive fabric portion, and the controller electrically coupled to each of the temperature sensors of each of the plurality heating zones of each of the thumb region, the index finger region, the middle finger region, the ring finger region and the pinky finger region, with the controller structurally configured to selectively couple the battery to the electrically conductive portion, to, in turn, independently supply current to heat each of the thumb region, the index finger region, the middle finger region, the ring finger region and the pinky finger region based upon a reading from each of the temperature sensors located therewith.

2. The heated glove of claim 1 wherein the heating assembly wherein the at least one heating zone comprises a plurality of heating zones.

3. The heated glove of claim 1 wherein the heated mesh portion of each of the heating zones is positioned at a distal end of each of the thumb region, the index finger region, the middle finger region, the ring finger region and the pinky finger region, and the temperature sensor is positioned adjacent to the distal end thereof and spaced apart from the heated mesh portion.

4. The heated glove of claim 1 wherein the conductive fabric portion is attached to the outer surface of the inner body.

5. The heated glove of claim 1 wherein the conductive fabric portion is stitched to the outer surface of the inner body.

6. The heated glove of claim 1 wherein the first circuit portion extends on an upper side of the outer surface of the inner body of the glove structure and the second circuit portion extends on a lower side of the outer surface of the inner body of the glove structure.

7. The heated glove of claim 1 further comprising an outer body extending over the inner body, with the heating assembly being at least partially positioned therebetween.

8. The heated glove of claim 1 wherein the heating assembly further comprises a controller coupling port, with the controller releasably couplable to the controller coupling port.

9. A method of controlling the heating of a glove, the method comprising:

providing a glove structure having an inner body with a base region, a thumb region, an index finger region, a middle finger region, a ring finger region and a pinky finger region;

providing a conductive heating mesh portion with each of the thumb region, the index finger region, the middle finger region, the ring finger region and the pinky finger region, the conductive heating mesh portion comprising a plurality of interwoven conductive threads:

electrically coupling each conductive heating mesh portion with a voltage difference through electrically conductive fabric portions extending to the heating mesh portion and completing an electrical circuit therewith, the electrically conductive fabric portions comprising a mesh having a plurality of woven conductive threads:

providing a temperature sensor with each of the thumb region, the index finger region, the middle finger region, the ring finger region and the pinky finger region;

sensing the temperature at each of the thumb region, the index finger region, the middle finger region, the ring finger region and the pinky finger region; and directing current individually to the conductive heating mesh portion of any one or more of the thumb region, the index finger region, the middle finger region, the ring finger region and the pinky finger region through the conductive fabric portion, the conductive fabric portion having a resistance that is lower than that of the heating mesh portion, when the temperature sensed therein by a respective one of the temperature sensors falls below a predetermined temperature.

10. The method of claim 9 further comprising the step of:

releasably attaching a controller to the glove structure, the controller being in electrical communication with each heating mesh portion, each temperature sensor, and a power supply.

11. A heated glove comprising:

a glove structure having an inner body having an outer surface, an inner surface defining a cavity with an opening providing ingress into the cavity, the glove structure further having a base region, a thumb region, an index finger region, a middle finger region, a ring finger region and a pinky finger region;

a heating assembly having a plurality of heating zones, wherein each of the plurality of heating zones is located at each of the thumb region, the index finger region, the middle finger region, the ring finger region and the pinky finger region, each of the plurality of heating zones having:

a electrically conductive fabric portion defining a mesh having a plurality of interwoven conductive threads with a first circuit portion and a second circuit portion, the two portions having a first end across which a voltage differential is placeable, and second ends that are spaced apart from each other;

an electrically conductive heating mesh portion having a plurality of interwoven conductive threads extending between the second ends of the first and second circuit portions so as to be in electrical communication therewith, wherein the electrically conductive fabric portion has a resistance that is lower than a resistance of the heating mesh portion, and wherein the electrically conductive heating mesh portion extends; and a sensing assembly having- temperature sensors, each of the temperature sensors being positioned adjacent to the heating mesh portion to determine a temperature of an area adjacent thereto; and a controller coupling port spaced apart from each of the thumb region, the index finger region, the middle finger region, the ring finger region and the pinky finger region, and including a contact for each of the temperature sensors and each of the conductive fabric portions of each of the thumb region, the index finger region, the middle finger region, the ring finger region and the pinky finger region, and structurally configured to receive a controller having a power source selectively attachable to each contact, to in turn, independently supply current to heat each of the thumb region, the index finger region, the middle finger region, the ring finger region and the pinky finger region based upon a reading from each of the temperature sensors located therewith.

* * * * *